March 2, 1965

H. A. JAMES 3,171,613

COMBINED DUCTED FAN DOOR AND WING FLAP

Filed May 15, 1964

INVENTOR.
HARRY A. JAMES
BY
*Knox & Knox*

March 2, 1965  H. A. JAMES  3,171,613
COMBINED DUCTED FAN DOOR AND WING FLAP
Filed May 15, 1964  3 Sheets-Sheet 2

INVENTOR.
HARRY A. JAMES
BY
Knox & Knox

INVENTOR.
HARRY A. JAMES
BY Knox & Knox

United States Patent Office 3,171,613
Patented Mar. 2, 1965

3,171,613
COMBINED DUCTED FAN DOOR AND WING FLAP
Harry A. James, San Diego, Calif., assignor to The Ryan Aeronautical Co., San Diego, Calif.
Filed May 15, 1964, Ser. No. 367,640
5 Claims. (Cl. 244—12)

The present invention is related to aircraft and more specifically to a combined ducted fan door and wing flap for an aircraft having a ducted fan installed in the wing.

In aircraft having ducted fans mounted in the wings for vertical thrust, the ducts must be covered in high speed flight when the fans are not operative. Various types of doors have been proposed and are necessarily large to cover the duct opening, these large doors require powerful actuating means to move them, particularly against air drag while the aircraft is in flight.

The primary object of this invention is to provide a combined ducted fan door and wing flap which move as a unit, the structure being simple to balance dynamically and statically and being operable by actuators of reasonable size.

Another object of this invention is to provide a door and flap combination which can be operated by common actuating means, so eliminating an extra actuating system.

Another object of this invention is to provide a ducted fan door and flap combination wherein the door guides air flow into the duct and coacts with the flap to entrain air over the wing and flap to increase lift.

A further object of this invention to to provide a door and flap combination wherein motion of the door between open and closed positions, during transition between vertical and horizontal flight, ensures efficient air flow into the fan duct and over the wing at all times.

In the drawings.

Similar characters of reference indicate similar or identical elements and portions throughout the specification and throughout the views of the drawing.

Basic structure

Figure 1:
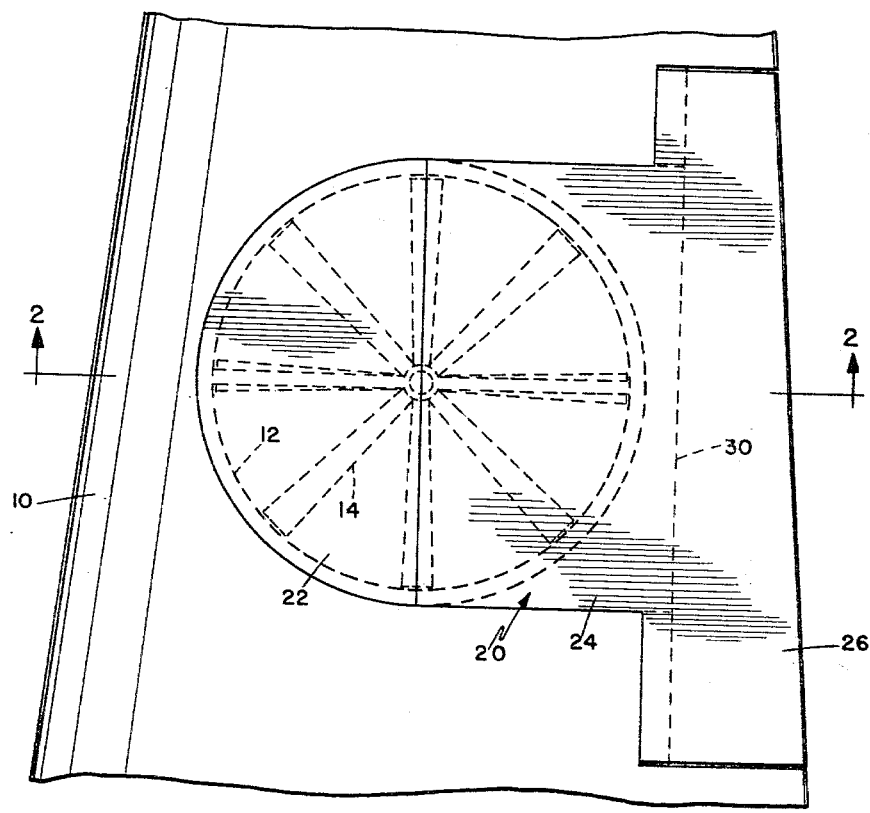
FIGURE 1 is a top plan view of part of an aircraft wing incorporating the fan door and flap combination.

The installation comprises an aircraft wing 10 having a circular duct 12 extending vertically through the wing. In the duct is mounted a fan 14, or multiple fans, driven by any suitable source of power, not shown. The configuration is well known and various designs have used fans driven through gear boxes, or by tip turbines, the specific drive and mounting arrangement being dependent on the type of aircraft. In the lower end of the duct 12 are vanes 16 extending spanwise of the wing and hinged to swing downwardly from the wing. Vanes 16 are interconnected and are operated collectively by a jack 18, or similar actuator. In the closed position the vanes cover the duct and form part of the lower wing surface, while in various open positions the vanes deflect the air flow from the fan. This arrangement is also well known and is described merely to illustrate the cooperation with the door and flap installation.

Door and flap installation

The door unit 20 includes a semi-circular front door portion 22 and a generally rectangular rear door portion 24, the latter extending rearwardly and being joined to a trailing edge flap 26, which extends laterally on either side of the door itself to provide the necessary area. The door portions cover the open upper end 28 of duct 12 and fit into the wing when closed to form a smooth continuation of the upper wing surface, as indicated in the full line position in FIGURE 2. The forward edge of flap 26 is pivotally connected at its forward edge to the rear wing spar 30 by a hinge or hinges 32, said flap and the integral door thus being hinged as a unit on an axis substantially spanwise of the wing. Flap 26 is actuated by a jack 34, or the like, to swing downwardly below the wing in the manner of a conventional flap, which simultaneously raises the door above the wing. The areas and weights of the door and flap are arranged so that the unit is as near as possible in static and dynamic balance about hinges 32, so that actuator loads are minimized. The specific arrangement of the wing spar and hinges and the configuration of the flap will depend on the aircraft and the type of basic structure used. Front portion 22 of the door is connected to the rear portion 24 by a hinge 36 whose axis is substantially parallel to the axis of hinges 32. A jack 38 is connected between front portion 22 and rear portion 24 to fold said front portion down in front of the rear portion when the door is opened, so reducing the overall height and the aerodynamic drag.

Operation

Figure 2:
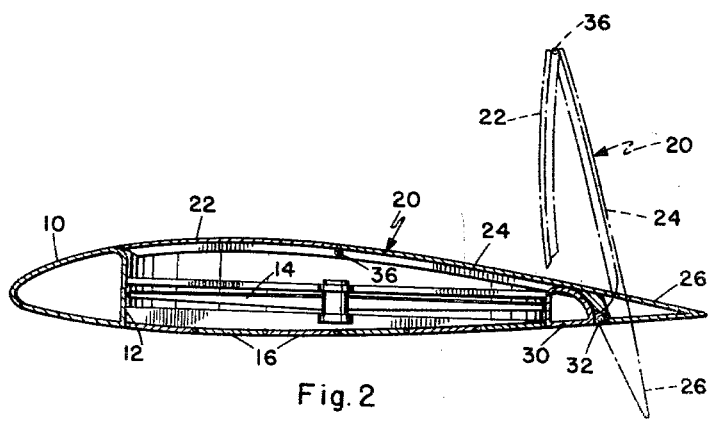
FIGURE 2 is a sectional view taken on line 2—2 of FIGURE 1.
Figure 5:
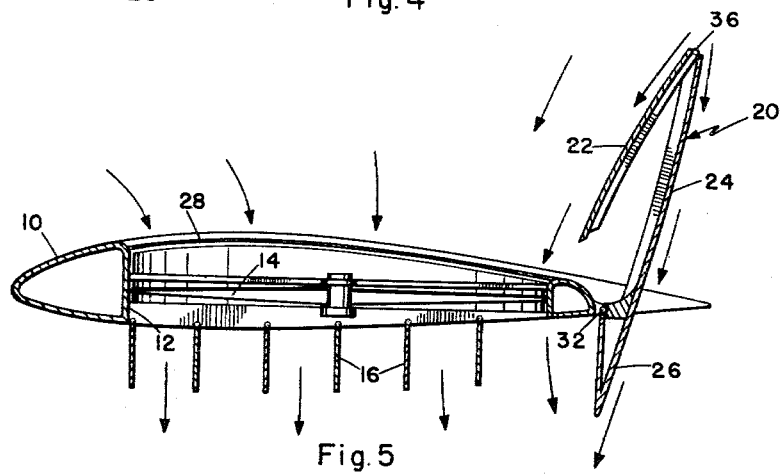
FIGURE 5 is a sectional view similar to FIGURE 2, showing the hovering or vertical flight position of the door and flap.

For a vertical take-off, the door unit 20 is opened with the front portion 22 folded down, as in the full line position in FIGURE 2. Vanes 16 will also be lowered to direct the fan slipstream down for vertical thrust. With the fan 14 in operation air is drawn through duct 12 and ejected downwardly, causing the aircraft to rise vertically. If necessary the door unit 20 can be inclined slightly rearwardly, as in FIGURE 5, to open the duct more fully and increase the capture area from which ambient air is drawn into the duct. The incoming flow of air flows over a considerable area of the upper wing surface and adds to the lift. In addition, the air flow is divided by the door unit 20, some of the air flowing down the rear side of the door, as indicated by directional arrows in FIGURE 5. This entrains air flow over the flap 26 and over the rear portion of the wing on either side of the door unit, which tends to keep the air attached to the upper surface of the wing over a considerable area and has somewhat the effect of a jet flap. By the cooperation between the raised door and lowered flap, lift is greatly enhanced when most needed.

Figure 3:
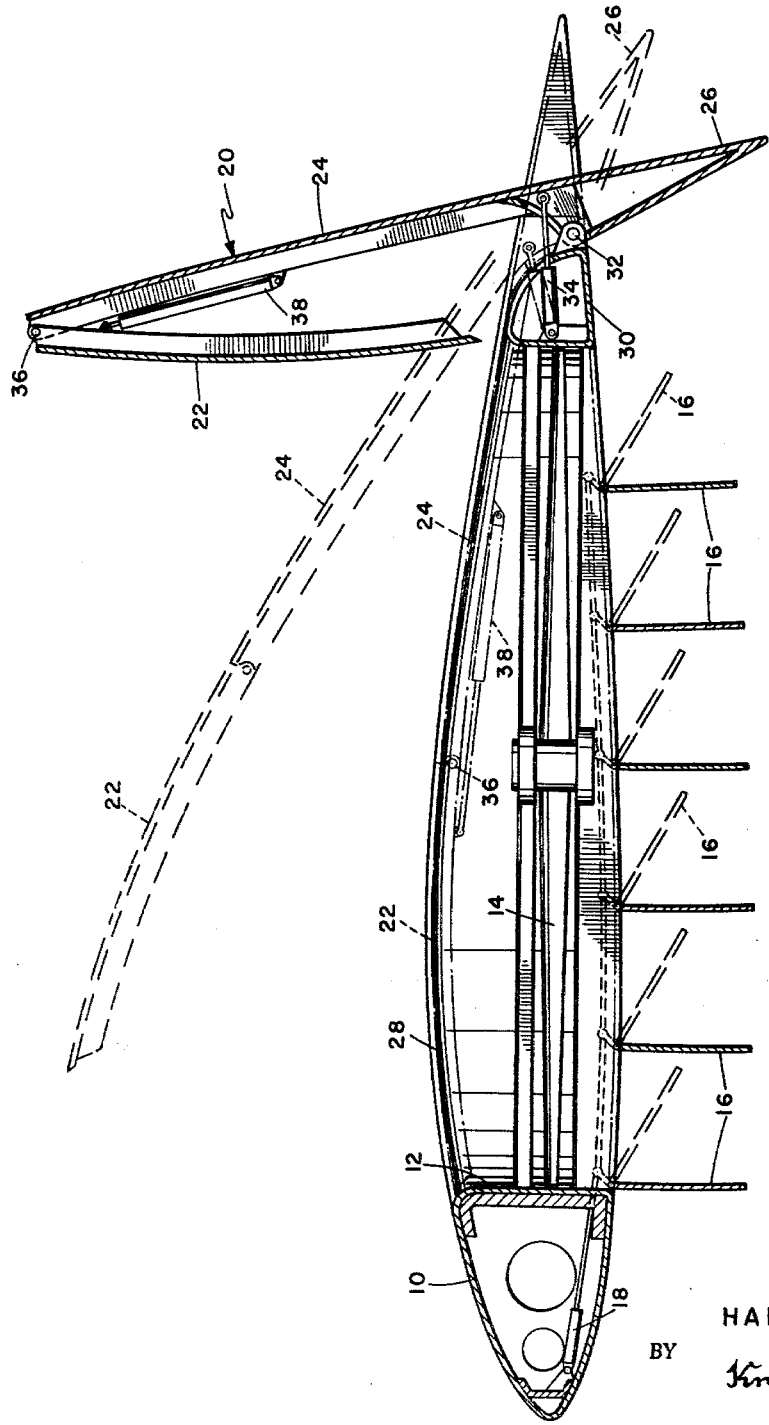
FIGURE 3 is an enlarged sectional view similar to FIGURE 2, showing the operation of the door and flap.
Figure 4:
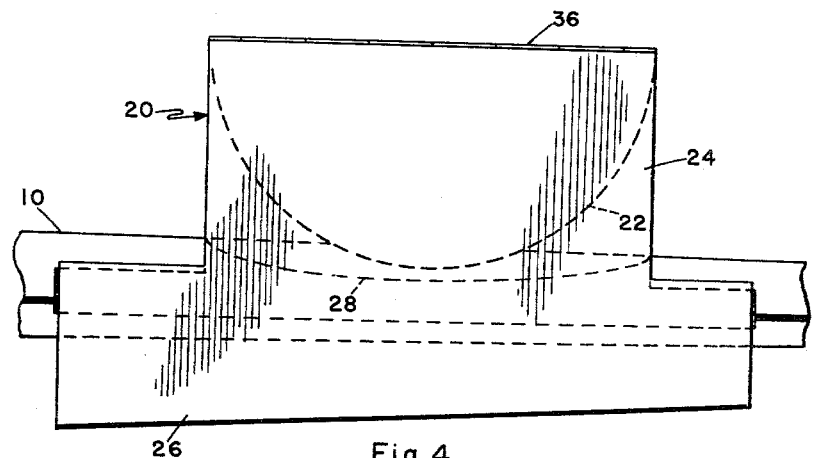
FIGURE 4 is a rear elevation view of the wing with the door open.

To move the aircraft forward the vanes 16 are turned rearwardly, as indicated in dash line in FIGURE 3, so deflecting the fan air flow to provide a forward thrust reaction. At the same time the door unit is swung forward, front portion 22 being unfolded and extended, as in the dash line position of FIGURE 3. The air flow over the wing is thus guided into duct 12 by the door unit at all times during transition from vertical to horizontal flight. With the door unit 20 inclined forwardly at any position during closing, air flow is divided over the edge of the door and the entrained air over the wing and flap continues to add to the lift. In the high speed forward flight position, the door unit 20 and vanes 16 are fully closed, as indicated in broken line in FIGURE 3. Fan 14 is inoperative and propulsion is provided by other means, not shown.

To make a steep or vertical landing approach, the door unit 20 and vanes 16 are opened and fan 14 put into operation, the transition being smooth as the door unit is raised to fully open position. Vanes 16 may be coordinated with the door unit control system, the particular manner of control depending on the type of aircraft.

Modified door unit

Figure 6:
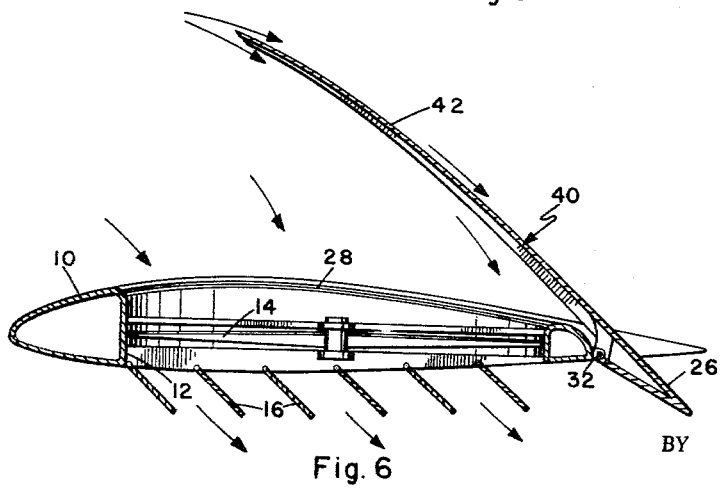
FIGURE 6 is a sectional view showing an alternative door structure.

In small aircraft it may be undesirable to have the weight of the folding door and its actuating jack, particularly if the door structure is light enough so that a reasonably sized actuator can be used for the entire door unit. In this event, the structure of FIGURE 6 may be used, in which all features are as described above except that the door unit 40 has a unitary door portion 42 integral with a wing flap 26. The operation and aerodynamic action are as described for the folding door.

The door unit thus serves the dual purpose of a fan duct door and a wing flap, operated by a single actuator of reasonable size since the unit is balanced. The door and flap cooperate aerodynamically to enhance lift at all positions between fully open and nearly closed. In addition to saving weight in the actuating system, further weight is saved by the common hinge mountings for door and flap.

It is understood that minor variation from the form of the invention disclosed herein may be made without departure from the spirit and scope of the invention, and that the specification and drawings are to be considered as merely illustrative rather than limiting.

I claim:
1. In an aircraft wing having a ducted fan duct extending substantially vertically through the wing, a combined door and wing flap unit, comprising:
   a flap pivotally mounted on the rear portion of said wing to swing downwardly therefrom;
   a door integral with said flap and extending forwardly therefrom to cover the upper end of said duct in a closed position;
   and actuating means connected to said door and flap unit to move the unit between the said closed position and an open position with said door raised and said flap extending below the wing.
2. The structure according to claim 1 wherein said door and flap unit is substantially balanced about the pivotal connection thereof to the wing.
3. In an aircraft wing having a ducted fan duct extending substantially vertically through the wing, a combined door and flap unit, comprising:
   a flap having a hinge connection to the rear portion of said wing to swing downwardly therefrom on an axis substantially spanwise of the wing;
   a door integral with said flap and extending forwardly therefrom to cover the upper end of said duct and form a continuation of the upper surface of the wing in a closed position;
   an actuating means connected to said door and flap unit to move the unit between the said closed position and an open position with said door raised and said flap extending below the wing.
4. The structure according to claim 3 wherein said door has a forward portion hinged to fold against the rear portion of the door when said door is open.
5. The structure according to claim 3 wherein said door has a forward portion hinged to fold downwardly on an axis substantially parallel to the first mentioned hinged axis; and
   actuating means connected between the portions of said door to fold said forward portion when the door is open.

References Cited by the Examiner
UNITED STATES PATENTS 3,080,137   3/63   Hurel _____ 244—12
3,131,873   5/64   Sanders _____ 244—12

FERGUS S. MIDDLETON, *Primary Examiner.*

RALPH D. BLAKESLEE, *Examiner.*